United States Patent [19]

Ogura et al.

[11] Patent Number: 5,173,126
[45] Date of Patent: Dec. 22, 1992

[54] ALUMINUM BRAZING PASTE

[75] Inventors: Toshiaki Ogura, Minoo; Tadashi Takemoto, Toyonaka; Tatsuyuki Ujie, Shiga, all of Japan

[73] Assignees: Kabushiki Kaisha Nihon Genma; Toyo Aluminium Kabushiki Kaisha, both of Osaka, Japan

[21] Appl. No.: 879,308

[22] Filed: May 7, 1992

[30] Foreign Application Priority Data

May 7, 1991 [JP] Japan .................. 3-101336

[51] Int. Cl.$^5$ ............................. B23K 35/34
[52] U.S. Cl. ...................... 148/23; 148/24; 148/25
[58] Field of Search ................... 148/23-25

[56] References Cited

U.S. PATENT DOCUMENTS

| | | | |
|---|---|---|---|
| 3,166,402 | 1/1965 | Berson | 148/24 |
| 3,171,734 | 3/1965 | Berson | 148/24 |
| 3,321,828 | 5/1967 | Miller | 148/24 |
| 3,697,333 | 10/1972 | Hoeffleur | 148/24 |
| 3,971,501 | 7/1976 | Cooke et al. | 228/248 |
| 4,151,016 | 4/1979 | Lee | 148/24 |

FOREIGN PATENT DOCUMENTS

| | | |
|---|---|---|
| 51-123749 | 10/1976 | Japan . |
| 58-027037 | 6/1983 | Japan . |
| 62-081266 | 4/1987 | Japan . |
| 62-046280 | 10/1987 | Japan . |
| 63-043200 | 8/1988 | Japan . |
| 1-143794 | 6/1989 | Japan . |
| 1-143795 | 6/1989 | Japan . |
| 1-143796 | 6/1989 | Japan . |
| 2-142674 | 5/1990 | Japan . |
| 2-147193 | 6/1990 | Japan . |
| 2-268995 | 11/1990 | Japan . |
| 3-57587 | 3/1991 | Japan . |

Primary Examiner—Peter D. Rosenberg

[57] ABSTRACT

Discloses an aluminium brazing paste which not only has excellent preservability and coating performance but also reveals excellent brazing characteristics; said aluminium brazing paste according to this invention comprises, per 100 parts by weight of aluminum-containing metal powder with 10 to 500 μm of mean particle size for aluminium brazing, of 0.5 to 15 parts by weight of flux and 30 to 80 parts by weight of a liquid polyisobutylene with 300 to 1500 of average molecular weight and/or its hydrogenated product.

4 Claims, 2 Drawing Sheets

ALUMINUM BRAZING PASTE

BACKGROUND OF THE INVENTION

1. Field of the Invention

The present invention relates to an aluminium brazing paste to be used for joining aluminium-made devices to one another. The term "aluminium-made" used herein is to be understood to include various aluminium alloys unless otherwise specified.

2. Description of the Prior Art

As the method for brazing aluminium-made devices to one another using metal powder, a method has been employed that the aluminium oxide film present on the surface of the area to be joined is removed using flux, and then brazed. In this method, since the resin to be added as a vehicle or a stickiness-improving agent (for example carboxy-methylcellulose, rosins and vinyl acetate resin) is separated and/or carbonized in the course of raising temperature to the brazing temperature (about 600° C.), voids or black residues tend to occur in the fillet to cause defective appearance and defective joining. It is also noted that formation of reactive pyrolytic products often causes deterioration in the performance of the aluminium brazing paste and other problems.

For the sake of solving these problems it has been known that an organic resin that is volatilized away instead of being decomposed or carbonized during the heating process to the brazing temperature is formulated to the metal powder for brazing as a vehicle or a binder. As the resins for such a purpose, for example, acrylic resins are disclosed in Japanese patent laid-open publication No. 147193/1990; ethylene oxide polymers, polyacrylate polymers, polymethacrylate polymers, polyacrylonitrile polymers, polyethyleneglycols and their methyl ethers and aliphatic hydrocarbon polymers are described in Japanese patent publication No. 43200/1988; and polyisobutylene and polybutene are disclosed in Japanese patent laid-open publication No. 268995/1990.

However, in the invention disclosed in Japanese patent laid-open publication No. 147193/1990 toxic monomers with stimulant odor occur by pyrolytic depolymerization of acrylic resins posing problems in operation hygiene while in the one disclosed in Japanese patent publication No. 43200/1988, in which fluorides of alkali metal are employed together with highly hygroscopic chlorides as flux, washing process is required after brazing for prevention of corrosion of aluminium due to the action of the chlorides; in the disclosure in Japanese patent laid-open publication No. 268995/1990 there is no description on the aluminium brazing with an aluminium powder that poses such a particular problem as difficulty of obtaining sufficient joining strength due to prevention of flowing out of the metal molten within the powder at brazing since strong oxide film is present on the surface of the powder, and accordingly it is not clear whether the binder for the paste disclosed in the invention, namely the binder made by formulating polyisobutylene or other polymers with a definite amount of specific fluidity depressant, is effective as an ingredient of the aluminium brazing paste, and in addition no detailed description is given on flux. Cellulose-type resins and many polymers do not allow melting of the brazing metal powder upon heating often remaining metal residue which contain unmolten metal powders.

On the other hand, fluorine-type flux has been proposed as the flux to be used in aluminium brazing, for improving the above defects of chloride-type flux (see, for example, Japanese patent laid-open publication No. 123749/1976 and Japanese patent publications No. 27037/1983 and No. 46280/1987). In the inventions described in these publications an aqueous slurry made by dispersing water-insoluble, fluorine-type flux together with metal powder for brazing in water is made adhered onto the part to be joined, and after evaporating water off therefrom brazing is carried out, with the result of requiring additional heating process for the evaporation of water. There also is another problem of ready variation of viscosity along with time. It must also be pointed out that use of metal powder with a very large surface area requires a large amount of flux often causing pollution and corrosion of furnace wall and aluminium-made devices.

SUMMARY OF THE INVENTION

The present invention provides an aluminium brazing paste comprising a liquid polyisobutylene having an average molecular weight of 300 to 2000 or its hydrogenated product as a vehicle, flux and aluminum-containing metal powder. According to the present invention the above-discussed problems pertinent to conventional methods of joining aluminium-made devices using metal powder for brazing (brazing in the furnace or torch-brazing in the air) such as causing defective appearance, defective joining and corrosion with time on the joined area; evolution of very stimulant, toxic gas which is problematic in operation hygiene; and requirement of additional heating process during brazing can be solved; and making it possible to join by brazing aluminium-made devices to one another excellently by using minimum required amount of flux.

DETAILED DESCRIPTION OF THE INVENTION

Figure 1:
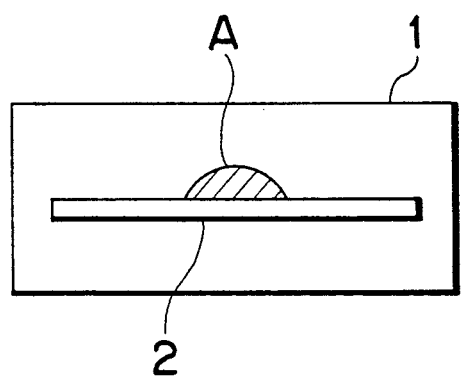
FIG. 1 is an upper view of the T-shaped joint which was used for evaluation of the properties of aluminium brazing pastes.

Thus, this invention relates to an aluminium brazing paste comprising, per 100 parts by weight of aluminum-containing metal powder with 10 to 500 μm of mean particle size for aluminium brazing, 0.5 to 15 parts by weight of flux and 30 to 80 parts by weight of a liquid polyisobutylene with 300 to 2000 of average molecular weight and/or its hydrogenated product.

The aluminum-containing metal powder for aluminium brazing includes aluminum powders, aluminum alloy powders, mixtures of the aboves and other metal powders such as Cu, Mg, Zn, etc, and the like, which has a melting point lower than that of the aluminium-made devices to be joined. Examples are Al-(5–12) % Si-type and Al-(5–12) % Si-X-type of alloys, where X=Cu, Mg or Zn; furthermore those alloys containing as a third ingredient element a trace amount of Bi, Sb or Ba, and Al-Zn-type alloys may also be used.

The mean particle size of these aluminum-containing metal powder is 10 to 500 μm, preferably 40 to 150 μm, and when it is less than 10 μm the specific surface area becomes so excessively large as producing a large amount of oxidize film with the result of causing difficulty in satisfactory fusion together of the aluminum-containing metal powder, while when it is more than 500 μm the powder is not only difficultly suspended in dispersion in the paste but also separates from each other by too large distance making close brazing difficult.

It is particularly desirable that the oxygen content of the aluminum-containing metal powder is not more than 0.2%, preferably not more than 0.1%. The metal powder with low oxygen content will give good appearance with little metal residue. It is because a reliable joining can be performed even though the amount of flux to be used is greatly reduced. For such a metal powder there is exemplified spherical or irregular-shaped powder such as pseudo-spkerical powder, platelet, flake and so on, atomized Al alloy powder which is manufactured by atomizing in a non-oxidative atmosphere. Depending on the particle size, shape and properties of the oxide film, more than 0.2% of the oxygen content of the aluminum-containing metal powder may cause insufficient fusion together due to that the oxidized surface film is not broken even though the temperature has been raised to an extent suitable for brazing. In such a case increase of the amount of flux to 20 to 50 parts by weight makes the brazing possible but many white residues and black spots develop on the brazed part and there occurs pollution on the furnace wall and on the joined devices and also corrosion thereon takes place.

Examples of the flux to be used in this invention are potassium fluoroaluminate complex such as $AlF_3$—KF, $KAlF_4$—$K_3AlF_6$, $K_3AlF_6$, $KAlF_4$ and other fluorine-type fluxes, but commercially available "Nocolok 100" (a product of Alcan Aluminum Limited, Canada) is especially suitable.

The amount of the above flux to be formulated is 0.5 to 15 parts by weight, preferably 0.5 to 5 parts by weight and especially preferably 0.5 to 1 part by weight, and in case where it is less than 0.5 part by weight satisfactory action of flux cannot be expected, while in more than 15 parts by weight it is not only useless but also it causes such a defective appearance on the joined products as developing many white residues and black spots on the surface of fillet and it also tends to cause pollution and corrosion on the furnace inside wall and on the brazed area of materials.

The ingredient to be used in this invention as vehicle is a liquid polyisobutylene with 300 to 2000 of average molecular weight and/or its hydrogenated product. This type of vehicle is an odorless and nonpoisonous substance, being extremely stable toward oxygen, ozone, acids, alkalis and ultraviolet ray, and since it is a liquid with so very low viscosity as 200 to 30,000 cSt ($200 \sim 30,000 \times 10^{-6} m^2/s$) at 20° C., it allows easy coating operation. In addition the polymer is completely depolymerized and volatilized at about 200° to 350° C. in the air and at about 300° to 400° C. in nitrogen atmosphere, and does not remain carbonized residue after brazing. It is noted that the above average molecular weight was determined by a VPO apparatus (the NPCC method) while the viscosity by a Canon-Fenske viscometer (following JIS K-2283).

When the liquid polyisobutylene has lower than 300 of average molecular weight, it is rather promptly dried and separates before it reaches the appropriate temperature.

When the average molecular weight is higher than 2000, especially higher than 1500 the flow ability of the aluminium brazing paste will be improper so as not to maintain suitable dispersibility of the aluminum-containing metal powder with the result of causing difficulty in forming fillet with good appearance. When the molecular weight is further higher, brazing performance will become worse.

The amount of vehicle to be formulated in the above paste is 30 to 80 parts by weight, preferably 40 to 60 parts by weight, and in case it is less than 30 parts by weight the vehicle will become crumbly and do not form paste.

When it is more than 80 parts by weight the metal content will be too low.

For the sake of regulating the coating performance of the aluminium brazing paste in the present invention, organic viscosity controller or solvent may be formulated, if desired, into the paste within the limit of not spoiling the effectiveness of the above ingredients formulated.

As the viscosity controller, wax, synthetic wax, paraffin wax, microcrystalline wax, polyethylene wax, hydrogenated oil, hydrogenated castor oil, fatty acid amide and polyamide may be mentioned as examples, but polyethylene wax and hydrogenated castor oil are particularly suitable. The viscosity of the aluminium brazing paste in this invention may be selected so as to correspond to the method of applying the paste, and it is not limited in particular, but ordinarily it is 10000 to 500000 cPs($10 \sim 500$ Pa·S)/23° C., preferably 30000 to 300000 cPs($30 \sim 300$ Pa·S)/23° C. The viscosity was estimated by using a Brookefield viscometer.

In case it is required to use a solvent in practicing this invention, non-polar solvents, especially hydrocarbon solvents such as hexane, heptane, octane, isoparaffin, cyclohexane, toluene and xylene may be employed.

Into the aluminium brazing paste according to this invention may be formulated, if desired, other ordinary additives in addition to the above ingredients. As such additives may be mentioned antioxidants (for example, BHT), corrosion inhibitors (for example benzotriazole), coloring agents (for example fluorescein and methyl orange), anti-foaming agents (for example silicone oil) and delustering agents.

Below given are examples for more detailed explanation of this invention.

EXAMPLES 1 to 11

Aluminium brazing pastes 1 to 11 according to this invention were prepared by the formulations shown in Table 1 below.

TABLE 1

| Ingredients or properties | Aluminum brazing pastes | | | | | | | | | | |
|---|---|---|---|---|---|---|---|---|---|---|---|
| | 1 | 2 | 3 | 4 | 5 | 6 | 7 | 8 | 9 | 10 | 11 |
| | Formulated amounts (parts by weight) | | | | | | | | | | |
| Metal powder for brazing (1) | 100 | | | | | | | | | | |
| Metal powder for brazing (2) | | 100 | 100 | 100 | 100 | 100 | 100 | 100 | 100 | 100 | 100 |

TABLE 1-continued

| Ingredients or properties | Aluminum brazing pastes | | | | | | | | | | |
|---|---|---|---|---|---|---|---|---|---|---|---|
| | 1 | 2 | 3 | 4 | 5 | 6 | 7 | 8 | 9 | 10 | 11 |
| | Formulated amounts (parts by weight) | | | | | | | | | | |
| Fluoride-type flux (3) | 2 | 2 | 2 | 2 | 2 | 3.5 | 5 | 1.2 | 2 | 2 | 2 |
| Vehicle (4) | 47 | 47 | 47 | | | 47 | 47 | 47 | 48 | | |
| Vehicle (5) | | | | 47 | | | | | | | |
| Vehicle (6) | | | | | 47 | | | | | | |
| Vehicle (7) | | | | | | | | | | 38 | |
| Vehicle (8) | | | | | | | | | | | 44 |
| Viscosity controller (9) | 1.5 | 1.5 | | 1.5 | 1.5 | 1.5 | 1.5 | 1.5 | | 1.5 | 2.4 |
| Viscosity controller (10) | | | 1.5 | | | | | | | | |
| Solvent (11) | | | | | | | | | | 9.3 | |
| Viscosity controller (12) | | | | | | | | | | | 2.4 |
| Metal residue | C | A | B | B | A | A | A | C | A | B | A |
| Flux residue | A | A | A | A | A | B | B | A | A | A | A |
| Brazing fluidity | B | A | A | A | A | A | A | B | A | B | A |
| Fillet shape | B | A | A | A | A | A | A | B | A | A | A |
| Paste stability | A | A | A | A | A | A | A | A | C | A | A |
| Viscosity change | A | A | A | A | A | A | A | A | C | A | A |
| Corrosion | A | A | A | A | A | A | A | A | A | A | A |

Footnotes to Table 1 are as follows:
(1) Al-8% Si alloy powder (mean particle size: 40 μm, oxygen content: 0.05%)
(2) Al-8% Si alloy powder (mean particle size: 70 μm, oxygen content: 0.02%)
(3) "Nocolok": Registered trade name owned by Alcan Aluminum Limited
(4) Liquid polyisobutylene (average molecular weight: 500, viscosity: 205 cSt (205 × $10^{-6}$ m²/s)/40° C.)
(5) Liquid polyisobutylene (average molecular weight: 780, viscosity: 4400 cSt (4400 × $10^{-6}$ m²/s)/40° C.)
(6) Liquid polyisobutylene hydrogenated product (average molecular weight: 780, viscosity: 4400 cSt (4400 × $10^{-6}$ m²/s)/37.8° C.)
(7) Liquid polyisobutylene (average molecular weight: 970, viscosity: 9600 cSt (9600 × $10^{-6}$ m²/s)/40° C.)
(8) Liquid polyisobutylene (average molecular weight: 330, viscosity: 19.5 cSt (19.5 × $10^{-6}$ m²/s)/40° C.)
(9) Polyethylene wax ("Hi-wax 110P", a product of Mitsui Petrochemical Industries, Ltd.; molecular weight: 1000, melting point: 109° C.)
(10) Paraffin (melting point: 145° F. (63° C.))
(11) "Isosol 400", a product of Nippon Petrochemicals Co., Ltd.
(12) Hydrogenated castor oil The properties of the aluminium brazing pastes 1 to 11 as prepared by the above formulations are included in Table 1.

COMPARATIVE EXAMPLES 1' to 8' AND EXAMPLES 1" to 10"

Aluminium brazing pastes 1' to 8' and 1" to 10" were prepared by the formulations shown in Tables 2 and 3 below.

TABLE 2

| Ingredients or properties | Aluminum brazing pastes | | | | | | | |
|---|---|---|---|---|---|---|---|---|
| | 1' | 2' | 3' | 4' | 5' | 6' | 7' | 8' |
| | Formulated amounts (parts by weight) | | | | | | | |
| Metal powder for brazing (1) | 100 | 100 | 100 | 100 | 100 | 100 | 100 | 100 |
| Fluoride-type flux (2) | 2 | 2 | 2 | 2 | 2 | 2 | 61.1 | |
| Chloride-type flux (3) | | | | | | | | 61.1 |
| Vehicle (4) | | | | | | | 61.1 | 61.1 |
| Vehicle (5) | 33.8 | | | | | | | |
| Vehicle (6) | | 29 | | | | | | |
| Vehicle (7) | | | 2.4 | | | | | |
| Vehicle (8) | | | | 4.8 | | | | |
| Vehicle (9) | | | | | 14.1 | | | |
| Viscosity controller (10) | 1.5 | 1.5 | 1.5 | 1.5 | 1.5 | | | |
| Solvent (11) | 14.6 | | 46 | 43.6 | 32.8 | | | |
| Solvent (12) | | 19.4 | | | | | | |
| Water | | | | | | 48.4 | | |
| Metal residue | E | E | E | E | D | D | C | C |
| Flux residue | E | E | E | E | E | E | D | D |
| Brazing fluidity | E | E | E | E | E | E | D | D |
| Fillet shape | E | E | E | E | E | E | D | D |
| Paste stability | A | A | A | A | B | A | E | E |
| Viscosity change | C | B | B | B | B | E | C | D |

TABLE 2-continued

| Ingredients or properties | Aluminum brazing pastes |||||||| 
|---|---|---|---|---|---|---|---|---|
| | 1' | 2' | 3' | 4' | 5' | 6' | 7' | 8' |
| | Formulated amounts (parts by weight) |||||||| 
| Corrosion | E | E | E | E | E | E | C | D |

Footnotes to Table 2 are as follows:
(1) Al-8% Si alloy powder (mean particle size: 70 μm, oxygen content: 0.02%)
(2) "Nocolok"
(3) 21% LiCl, 40% KCl, 22.5% NaCl, 9% LiF, 8.5% $ZnCl_2$
(4) Liquid polyisobutylene (average molecular weight: 500, viscosity: 205 cSt (205 × $10^{-6}$ $m^2/s$)/40° C.)
(5) Rosin
(6) Polyvinyl acetate (50% ethyl acetate)
(7) Ethylcellulose
(8) Ethylhydroxycellulose
(9) Poly(methyl methacrylate
(10) Polyethylene wax (molecular weight: 1000, melting point: 109° C.)
(11) Diethyleneglycol dibutylether
(12) Kerosene

TABLE 3

| Ingredients or properties | Aluminum brazing pastes ||||||||||
|---|---|---|---|---|---|---|---|---|---|---|
| | 1" | 2" | 3" | 4" | 5" | 6" | 7" | 8" | 9" | 10" |
| | Formulated amounts (parts by weight) ||||||||||
| Metal powder for brazing (1) | 100 | 100 | 100 | 100 | 100 | 100 | 100 | 100 | 100 | 100 |
| Fluoride-type flux (2) | 2 | 2 | 2 | 2 | 2 | 2 | 2 | 2 | 2 | 2 |
| Vehicle (3) | | | | 28 | | | | | | |
| Vehicle (4) | | | | | 28 | | | | | |
| Vehicle (5) | | | | | | 23.5 | | | | |
| Vehicle (6) | | | | | | | 14.1 | | | |
| Vehicle (7) | | | | | | | | 14.1 | | |
| Vehicle (8) | | | | | | | | | 14.1 | |
| Vehicle (9) | | | | | | | | | | 14.1 |
| Vehicle (10 | 44 | | | | | | | | | |
| Vehicle (11) | | 47 | | | | | | | | |
| Vehicle (12) | | | 38 | | | | | | | |
| Solvent (13) | | | 9.3 | 18.8 | 18.8 | 23.5 | 32.8 | 32.8 | 32.8 | 32.8 |
| Viscosity controller | 2.4 | 1.5 | 1.5 | 1.5 | 1.5 | 1.5 | 1.5 | 1.5 | 1.5 | 1.5 |

Footnotes to Table 3 are as follows:
(1) Al-8% Si alloy powder (mean particle size: 70 μm, oxygen content: 0.02%)
(2) "Nocolok"
(3) Liquid polyisobutylene (average molecular weight: 1350, viscosity: 28,000 cSt (28 × $10^{-3}$ $m^2/s$)/40° C.)
(4) Liquid polyisobutylene (average molecular weight: 2700, viscosity: 171,000 cSt (171 × $10^{-3}$ $m^2/s$)/40° C.)
(5) Liquid polyisobutylene (average molecular weight: 3650, viscosity: 320,000 cSt (320 × $10^{-3}$ $m^2/s$)/40° C.)
(6) Liquid polyisobutylene (average molecular weight: 30000, viscosity: 20,000 cSt (20 × $10^{-3}$ $m^2/s$)/160° C.)
(7) Liquid polyisobutylene (average molecular weight: 40000, viscosity: 55,000 cSt (55 × $10^{-3}$ $m^2/s$)/160° C.)
(8) Liquid polyisobutylene (average molecular weight: 50000, viscosity: 97,000 cSt (97 × $10^{-3}$ $m^2/s$)/160° C.)
(9) Liquid polyisobutylene (average molecular weight: 60000, viscosity: 157,000 cSt (157 × $10^{-3}$ $m^2/s$)/160° C.)
(10) Liquid polyisobutylene (average molecular weight: 330, viscosity: 19.5 cSt (19.5 × $10^{-6}$ $m^2/s$)/40° C.)
(11) Liquid polyisobutylene (average molecular weight: 500, viscosity: 205 cSt (205 × $10^{-6}$ $m^2/s$)/40° C.)
(12) Liquid polyisobutylene (average molecular weight: 970, viscosity: 7600 cSt (7600 × $10^{-6}$ $m^2/s$)/40° C.)
(13) "Isosol 400", a product of Nippon Petrochemicals Co., Ltd.
(14) "Hi-wax 110P", a product of Mitsui Petrochemical Industries, Ltd.

The properties of the aluminium brazing pastes 1' to 8' and 1" to 10" which were prepared by the above formulations are included in Tables 2 and 3.

Figure 2:
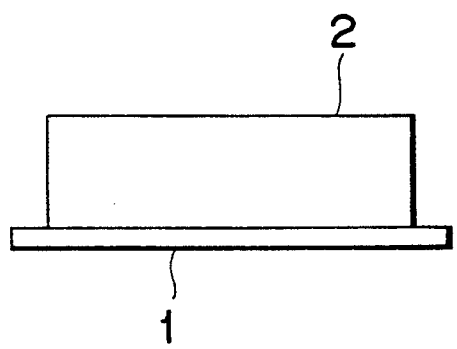
FIG. 2 is a front view of the T-shaped joint.

The properties of the aluminium brazing pastes shown in Tables 1 to 3 were evaluated by applying 260 mg of each test paste A onto the central part of one side of the T-shaped joint, shown in FIG. 1 (upper view) and FIG. 2 (front view), which was made by using an aluminium test plates 1 (2 mm×25 mm×60 mm) and 2 (2 mm×15 mm×50 mm) and then brazing (molten at 600° C. and held for 5 minutes) in an furnace in argon atmosphere. The evaluation ratings in each property are described as follows:

Metal residue (Residue of unmolten metal powder)
A: Excellent
B: Fair
C: Good
D: Wrong
E: Out of evaluation (Alloy powder did not turn into solder.)
Appearance due to flux residue
A: Excellent
B: Fair
C: Good
D: Wrong
E: Out of evaluation
Brazing fluidity (Fillet formation rate)
A: Fillet formation in 100%.
B: Fillet formation in not less than 80% and less than 100%.
C: Fillet formation in more than 50% and less than 80%.
D: Fillet formation in less than 50%.
E: Out of evaluation (not molten).
Shape of fillet (Thickness of fillet)
A: Nearly all of brazed metal gathered to make a fillet drawing an arc in the best tension.
B: Fillet with a thickness of about 70% of A was formed.
C: Fillet with a thickness of about 30% of A was formed.
D: Fillet was not formed.

E: Out of evaluation (not molten).

Paste stability (Separation in paste after 1 month at 25° C.)
  A: Not separated.
  B: Polymer spread over the paste.
  C: Separation of polymer was less than 10%.
  D: Separation of polymer was less than 20%.
  E: Not less than 20% of polymer separated.

Viscosity change
  A: Paste was very smooth and viscosity change was in less than 10%.
  B: Not smooth but no granules developed; viscosity change was in less than 50%.
  C: Small grains occurred, and the touch becomes rough; viscosity change was in less than 100%.
  D: Bean like grains occurred; viscosity change was in not less than 100%.
  E: Solidified.

Corrosion Test (Corrosion 96 hours after brazing)
  A: No corrosion took place after standing at 90% humidity at 40° C.
  B: Discolored after standing at 90% humidity at 40° C.
  C: Discolored in room environment.
  D: Corrosion took place in both brazing and mother materials in room environment.
  E: Out of evaluation (not molten).

Figure 3:
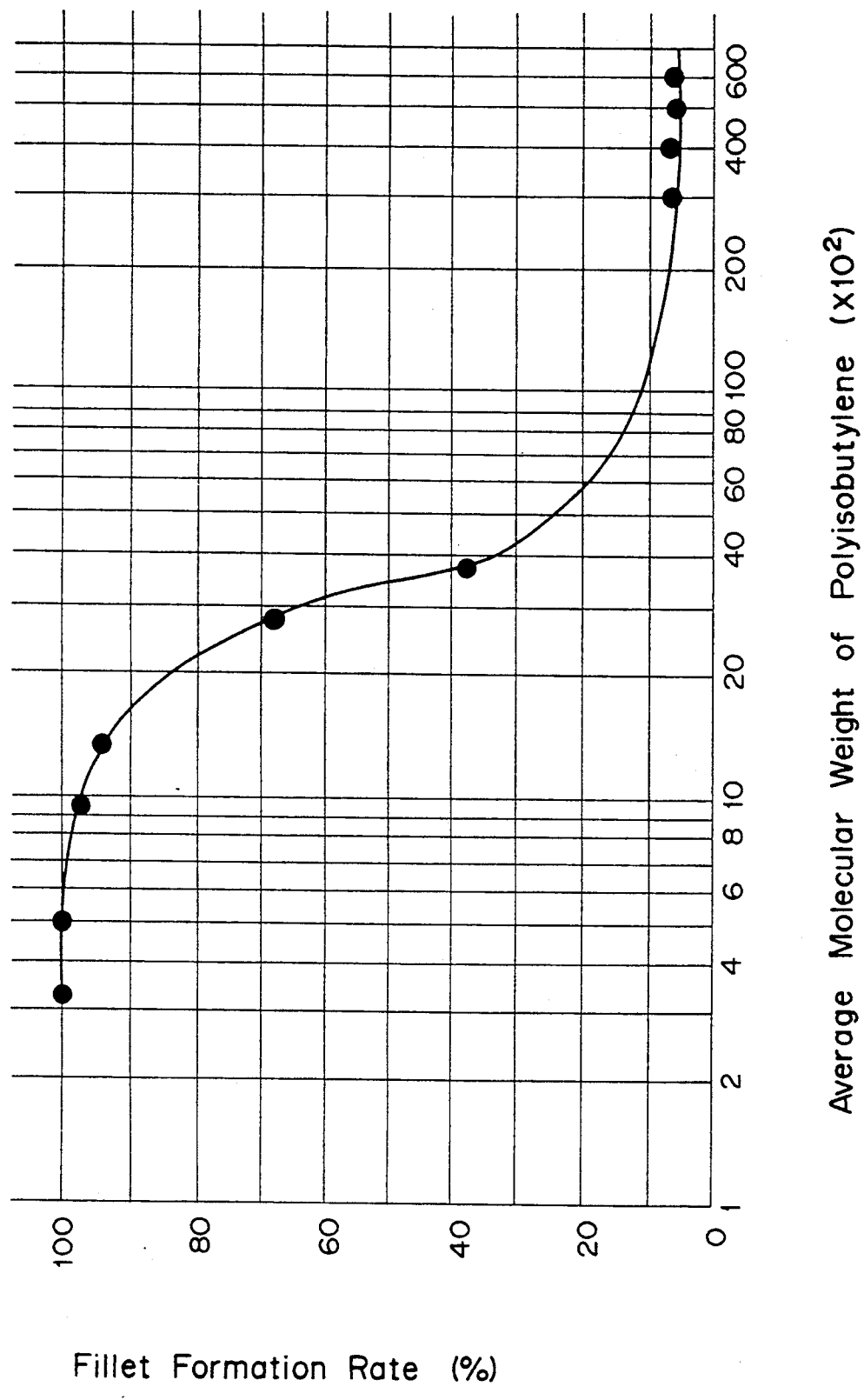
FIG. 3 is a graphic presentation of the relation between the average molecular weight of polyisobutylene (abscissa) and the fillet formation rate (ordinate).

For the sake of investigating the effect of the molecular weight of the liquid polyisobutylene on the fillet formation rate, the rate was studied on the aluminium brazing pastes 1″ to 10″ by the method described below. The results are shown in FIG. 3.

Fillet formation rate

The fillet formation rate was defined as the percentage of the length (mm) of fillet against the length (50 mm) of the perpendicular wall of the above-stated T-shaped joint.

The aluminium brazing paste according to this invention shows excellent stability (for example, metal powder and flux do not separate on standing for about 6 to 20 months at room temperature in the air) and coating performance as well as excellent brazing characteristics. When aluminium-made devices are brazed by using the paste, there does not develop stimulant, poisonous gas and the joined area does not show any defective appearance, defective joining and corrosion along with time. The brazing does not require additional heating process and produces excellently brazed products of the materials.

Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

We claim:

1. An aluminum brazing paste comprising 0.5 to 15 parts by weight of a fluorine-containing flux and 30 to 80 parts by weight of liquid polyisobutylene and/or its hydrogenated product with 300 to 2000 of average molecular weight, per 100 parts by weight of aluminum-containing metal powder with 10 to 500 $\mu$m of mean particle size for brazing of aluminum or aluminum alloys.

2. The aluminum brazing paste according to claim 1, further comprising a viscosity controller.

3. The aluminum brazing paste according to claim 1, wherein said metal powder for the aluminum brazing paste comprises a powder of aluminum alloy with not more than 0.2% of oxygen content.

4. The aluminium brazing paste according to claim 1, wherein said flux is a potassium fluoroaluminate complex.

* * * * *